United States Patent [19]

Mashiko

[11] Patent Number: 5,021,988
[45] Date of Patent: Jun. 4, 1991

[54] SEMICONDUCTOR NEURAL NETWORK AND METHOD OF DRIVING THE SAME

[75] Inventor: Koichiro Mashiko, Hyogo, Japan

[73] Assignee: Mitsubishi Denki Kabushiki Kaisha, Tokyo, Japan

[21] Appl. No.: 410,199

[22] Filed: Sep. 21, 1989

[30] Foreign Application Priority Data

Apr. 27, 1989 [JP] Japan .................................. 1-109716

[51] Int. Cl.⁵ ............................................. G06F 7/00
[52] U.S. Cl. .................................... 364/807; 364/513; 364/579; 307/201
[58] Field of Search ...................... 364/579, 807, 513; 365/203, 190, 227; 307/201

[56] References Cited

U.S. PATENT DOCUMENTS

| 4,580,245 | 4/1986 | Ziegler et al. | 365/190 |
| 4,660,166 | 4/1987 | Hopfield | 307/201 |
| 4,782,460 | 11/1988 | Spencer | 364/807 |
| 4,874,963 | 10/1989 | Alspector | 377/2 |

OTHER PUBLICATIONS

H. P. Graf et al., "VLSI Implementation of a Neural Network Model", Computer, IEEE, Mar. 1988, pp. 41-49.

J. Alspector et al, "A Neuromorphic VLSI Learning System", *Advanced Research in VLSI 1987* (MIT Press Publication Corporation (1987)), pp. 313-327.

*Primary Examiner*—Parshotam S. Lall
*Assistant Examiner*—Michael Zanelli
*Attorney, Agent, or Firm*—Lowe, Price, LeBlanc and Becker

[57] ABSTRACT

A semiconductor neural network includes a plurality of data input line pairs to which complementary input data pairs are transmitted respectively, data output line pairs respectively deriving complementary output data pairs and a plurality of coupling elements arranged at respective crosspoints of the data input lines and the data output lines. The coupling elements are programmable in states, and couple corresponding data output lines and corresponding data input lines in accordance with the programmed states thereof. Differential amplifiers formed by cross-coupled inverting amplifiers are provided in order to detect potentials on the data output lines. The differential amplifiers are provided for respective ones of the data output line pairs.

16 Claims, 10 Drawing Sheets

THRESHOLD FUNCTION

SIGMOID FUNCTION

200: SEMICONDUCTOR CHIP

SEMICONDUCTOR NEURAL NETWORK AND METHOD OF DRIVING THE SAME

BACKGROUND OF THE INVENTION

1. Field of the Invention

The present invention relates to a semiconductor neural network and a method of driving the same, and more particularly, it relates to the structure of a semiconductor neural network which implements stable and high-speed operation with low power consumption and to a method of driving the same.

2. Description of the Background Art

In recent years, various electronic circuits have been implemented modeling themselves on human nerve cells (neurons). One of such neuron models is called a Hopfield model. This Hopfield model is now briefly described.

FIG. 1 schematically shows the structure of a unit which is modeled on a neuron. This unit i includes an input part A which receives signals from other units k, j and the like, a conversion part B which converts the received inputs along a predetermined rule and an output part C which outputs the results of conversion. The input part A has weights (synapses) W showing strengths of connection between the unit i and other input units. Thus, a weight Wik is added to a signal Sk from the unit k, which is transmitted to the conversion part B. Each weight W can take a positive value, a negative value or zero. The conversion part B outputs the sum net of the inputs S to which the weights W are added, through a predetermined function f. An output $S_i$ from the unit i at a time t is provided as follows:

$$Ui(t) = net(i) = \sum_j WijSj \quad (1)$$
$$Si = f[Ui(t)]$$

A threshold function shown in FIG. 2A or a sigmoid function shown in FIG. 2B is generally employed as the function f.

The threshold function shown in FIG. 2A is a unit step function which outputs "1" when the sum net(i) of the inputs exceeds a threshold value $\theta$, while otherwise outputting "0".

The sigmoid function shown in FIG. 2B is a nonlinear, monotonously increasing function which is expressed as:

$$f = 1/[1 + \exp(-net(i))]$$

This sigmoid function, which is in a range of zero to 1, approaches "0" as the sum net(i) of the inputs decreases, while approaching "1" as the sum net(i) increases. This sigmoid function outputs "0.5" when the sum net(i) is "0".

A threshold value $\theta$ may be added to the aforementioned sigmoid function, thereby to use a function which is expressed as:

$$f = 1/[1 + \exp(-net(i) + \theta)]$$

The aforementioned unit is modeled on a vital nerve cell which receives stimuli from other neurons to generate (fire) an output or to fire when the sum of the stimuli exceeds a given value. The Hopfield model provides an operating model of a network which is formed by a plurality of such modeled neurons.

When initial states are supplied to respective neuron units in the aforementioned equations (1), the states of the respective neuron units are thereafter entirely determined in principle by simultaneously applying the aforementioned two dynamic equations (1) to all the neuron units and solving the same. If the number of the units increases, however, it is almost impossible to examine and grasp the states of the respective units one by one for programming weight and bias values in order to provide optimum solutions to a target problem. Therefore, Hopfield introduces an energy function which is defined as:

$$E = -(\tfrac{1}{2}) \sum_{i,j} WijSiSj - \sum_i IiSi$$

as a quantity expressing the property of the overall system (neural network) in place of the states of the respective units. Symbol Ii represents a self-bias value which is specific to a unit i. Hopfield has indicated that, when a weight (synapse load) Wij is symmetrical as Wij=Wji, each unit changes its state to regularly minimize the aforementioned energy function to the local minimum, and proposed to apply this model to programming of the weight Wij. The model having the aforementioned energy function is called a Hopfield model. The aforementioned model is generally expressed as follows:

$$Ui(n) = \sum WijSj(n) + Ii$$
$$Si(n+1) = F[Ui(n)]$$

as a discrete time model. Symbol n represents a discrete time. Hopfield himself has indicated that this Hopfield model is realized particularly in high accuracy when the slope of the function f showing input/output characteristics is abrupt (a function approximate to a unit step function with which almost all outputs take values close to "0" or "1").

A neural network constructed in a VLSI (very large scale integrated circuit) in accordance with the Hopfield model, is disclosed in "Computer", a magazine issued by IEEE (Institute of Electrical and Electronics Engineers), March 1988, pp. 41-49, for example.

FIG. 3 schematically shows overall structure of a conventional neural network integrated circuit. Referring to FIG. 3, the conventional neural network integrated circuit includes a resistive matrix 100 which is formed by an array of resistive coupling elements having predetermined weights and an amplifier circuit 101 which amplifies potentials on data input lines included in the resistive matrix 100 and feeds back the amplified signals to input parts of the resistive coupling elements. The resistive matrix 100 includes data input lines and data output lines which are arrayed orthogonally to the data input lines, as hereinafter described in detail. Interconnection states of the data output lines to the data input lines through the resistive coupling elements are programmable.

A row decoder 102 and a bit decoder 103 are provided in order to program the states of the respective resistive coupling elements included in the resistive matrix 100, i.e., the interconnection states between the data input lines and the data output lines. The row decoder 102 selects a row of the resistive matrix 100, while the bit decoder 103 selects a column thereof.

The circuit further includes an input/output data register 104 which temporarily latches input/output data, a multiplexer 105 which connects the input/output data register 104 to the data input lines or the data output lines included in the resistive matrix 100 in response to a data write/read mode and an interface (I/O) 106 for connecting the input/output data register 104 to the exterior of the circuit, in order to input or output data. This neural network is integrated on a semiconductor chip 200. FIG. 4 illustrates exemplary structure of the resistive matrix 100 shown in FIG. 3.

Referring to FIG. 4, the resistive matrix 100 includes data input lines A1 to A4 and data output lines B1 and $\overline{B1}$, B2 and $\overline{B2}$, B3 and $\overline{B3}$, and B4 and $\overline{B4}$. Resistive coupling elements 1 are provided on crosspoints of the data input lines A1 to A4 and the data output lines B1 and $\overline{B1}$ to B4 and $\overline{B4}$. The resistive coupling elements 1 can enter open, excitatory and inhibitory states. The states of the resistive coupling elements 1 can be programmed from the exterior in accordance with an applied problem. While FIG. 4 shows no resistive coupling elements which are in the open states, the resistive coupling elements 1 are provided in all the crosspoints between the data input lines and the data output lines. The resistive coupling elements 1 transmit potential levels on the corresponding data output lines onto the corresponding data input lines in accordance with the programmed states respectively.

The input lines A1 to A4 are respectively provided with inverting amplifiers 2-1 to 2-8 which amplify the data on the corresponding data input lines and transmit the same onto the corresponding data output lines. Each pair of series-connected inverters function as one amplifier unit. The inverter 2-1 inverts the potential on the data input line A1 and transmits the same onto the data output line B1. The inverter 2-2 transmits the data on the data input line A1 onto the data output line $\overline{B1}$. The inverter 2-3 transmits inverted data from the data input line A2 onto the data output line B2, and the inverter 2-4 transmits the data on the data input line A2 onto the data output line $\overline{B2}$. The inverters 2-5 and 2-6 invert and transmit the potential on the data input line A3 onto the data output lines B3 and $\overline{B3}$ respectively. The inverters 2-7 and 2-8 invert and transmit the potential on the data input line A4 onto the data output lines B4 and $\overline{B4}$ respectively.

Each of the coupling elements 1 connects the output of an amplifier to the input of another amplifier. FIG. 5 shows exemplary structure of each coupling element.

Referring to FIG. 5, the resistive coupling element 1 includes resistor elements R+ and R−, switching elements S1, S2, S3 and S4 and random access memory cells 150 and 151. An end of the resistor element R+ is connected to a source potential $V_{DD}$. The resistor element R− is connected to another source potential $V_{SS}$. The switching element S1 is on-off controlled by the output of an amplifier (inverter) 2b. The switching element S2 is on or off controlled by the random access memory cell 150. The ON/OFF state of the switching element S3 is set by the random access memory cell 151. The switching element S4 is on or off controlled by the output of an inverter 2a. Output states of the random access memory cells 150 and 151 can be previously programmed from the exterior, and hence ON/OFF states of the switching elements S2 and S3 can be also previously programmed.

In the structure shown in FIG. 5, the output of the amplifier circuit Ci (circuit formed by the inverters 2a and 2b) directly supplies no current to the corresponding input line. Thus, output load capacitance of the amplifier Ci is reduced. The resistor elements R+ and R− are current limit resistors.

The coupling element 1 can enter one of three states according to program states of the random access memory cells 150 and 151. The three states include an excitatory connection state in which the switching element S2 is in an ON state (active state), an inhibitory connection state in which the switching element S3 is in an active state (ON state) and an open connection state in which both of the switching elements S2 and S3 are in inactive states (OFF states). When potential levels of the output lines Bi and $\overline{Bi}$ of the amplifier circuit Ci match with the programmed connection state of a given resistive coupling element 1, a current flows to the corresponding input line Ai from either the source potential $V_{DD}$ or the other source potential (ground potential $V_{SS}$. When the resistive coupling element 1 is programmed in the open connection state, no current is transmitted to the input line Ai regardless of the output state of the amplifier circuit Ci.

When the aforementioned circuit model is associated with a neuron model, the amplifier circuit Ci corresponds to a neuron body (conversion part B in FIG. 1). The interconnections A1 to A4, B1 to B4 and $\overline{B1}$ to $\overline{B4}$ correspond to the data input and output line structure parts (dendrites and axons) shown in FIG. 1. The resistive coupling elements 1 correspond to the synapse load parts provided between the neurons for adding weights. The operation is now briefly described.

The model shown in FIG. 4 is often called a connectionist model. In this model, each neuron unit (amplifier circuit) merely thresholds an input signal, i.e., outputs a signal which corresponds to the value of the input signal with respect to a predetermined threshold value. Each resistive coupling element 1 connects the output of a given amplifier circuit to the inputs of other amplifier circuits. Thus, the state of each amplifier circuit Ci is determined by the states of all the remaining amplifier circuits Cj. When a given amplifier circuit Ci detects the current of a corresponding input line Ai (i=1 to 4), the output of the amplifier circuit Cj is provided as follows:

$$Vout(i) = f\left(\sum_j Ii\right)$$

$$= f\left(\sum_j (Vout(j) - Vin(i)Wij)\right)$$

where Vin(i) and Vout(i) represent input and output voltages of the amplifier circuit Ci which is connected to the data input line Ai, Ii represents a current flowing in one resistive coupling element 1 and Wij represents conductance of the resistive coupling element connecting the amplifier circuit Ci, which is connected to the data input line Ai, with the amplifier circuit Cj which is connected to the data input line Aj. The output voltage Vout(i) of each amplifier circuit Ci is provided by the transfer characteristic of the amplifier circuit Ci itself. An amplifier circuit C' (inverters 2a and 2b) supplies no current to any data input line, but merely controls on-off operation of the switching elements S1 and S4. Thus, the output load of the amplifier circuit C' is reduced to the data output line capacitance. The voltage of the input line Ai of a given amplifier circuit Ci is provided by the sum of currents flowing into the input line Ai. This voltage is adjusted to a value where the total current is zero. That is, the total energy of this electronic network is minimized at this time.

Each amplifier circuit Ci is formed by a CMOS inverter, for example, the input impedance of which is high and has the aforementioned nonlinear, monotonously increasing threshold function. In this case, the following relation holds from the aforementioned condition that the total current is zero:

$$\sum_i Iij = \sum_i \Delta Vij/Rij = 0 \qquad (2)$$

where symbol Iij represents a current flowing through the resistor of the resistive coupling element which is controlled by the output of the amplifier circuit Ci connected to the input line Ai. Symbol $\Delta Vij$ represents potential difference in the resistive coupling element, which potential difference is provided as follows:

$$\Delta Vij = Vin(j) - V_{DD} \quad \ldots \quad \text{(excitatory connection)}$$
$$= Vin(j) - V_{SS} \quad \ldots \quad \text{(inhibitory connection)}$$

Symbol Rij represents resistance of the resistive coupling element, which resistance is provided as R+ or R−. Thus, the voltage Vin(i) is the total sum of all outputs of the amplifier circuits which are connected to the data input lines Ai.

The amplifier circuit C′ functions as a high-gain threshold element. The threshold value of the amplifier circuit C′ is generally set at about ½ of the source potentials $V_{SS}$ and $V_{DD}$.

The above is analog calculation, which is performed within the resistive matrix 100 in a parallel manner. However, both the input and output data are digital data. Actual arithmetic operation is now briefly described with reference to FIG. 4.

The neural network is initialized when input data are supplied onto the respective input lines A1 to A4 through the register 10, so that the input lines A1 to A4 are charged at values corresponding to the input data. Output potentials of the amplifier circuits C1′ to C4′ are first changed in response to the charging potentials supplied to the input lines A1 to A4. Such potential changes on the data output lines are fed back to the data input lines A1 to A4 through corresponding resistive coupling elements. The potential levels fed back to the respective data input lines A1 to A4 are determined by program states of the respective resistive coupling elements 1. When a given resistive coupling element 1 is programmed in excitatory connection, a current flows from the source potential $V_{DD}$ to an input line Ai. When the resistive coupling element 1 is programmed in an inhibitory connection state, on the other hand, a current flows from the data input line Ai into the ground line $V_{SS}$. Such operations progress in a parallel manner in the matrix except for resistive coupling elements which are in open connection states, so that currents flowing into a given data input line Ai are added up in an analog manner thereby to change the potential at the data input line Ai. When such changed potential of the data input line Ai exceeds the threshold voltage of a corresponding inverting amplifier circuit Ci′, the output potential of this amplifier circuit Ci′ is changed. Such a state is repeated and the outputs of the amplifier circuits Ci′ are so changed as to satisfy the aforementioned condition that the total current is zero. The state of the network is finally stabilized to satisfy the aforementioned equation (2) for the stabilized state. After the state of the neural network is stabilized, the output voltages of the respective amplifier circuits Ci′ are stored in a register and thereafter read out. A decision of the stabilized state of the neural network is set by a predetermined time after data input, or made by directly comparing data stored in the register with each other wherein a decision is made that the neural network is stabilized when difference between the compared output data is below a predetermined value, to obtain the data output.

As described above, data minimizing the energy of the neural network are outputted as the output data. The resistive matrix 100 stores certain patterns and certain data in accordance with the program states of the resistive coupling elements 1. Therefore, the neural network, which can decide match/mismatch of the stored patterns or data and input data, also functions as an associative memory or a pattern discriminator.

Structure known as a single-layer perceptron circuit is obtained by removing feedback paths from the data output lines Bi and $\overline{Bi}$ to the data input lines Aj from the resistive matrix 100 shown in FIG. 4. This perceptron circuit, for which a learning algorithm is readily made, can be so multi-layered as to construct a flexible system.

In the aforementioned neural network, the data output lines are formed by the complementary line pairs Bi and $\overline{Bi}$ thereby to implement excitatory connection and inhibitory connection, for increasing the speed of convergence of the network to a stable energy state.

In this conventional neural network, the amplifier circuit Ci′ for transmitting a potential level corresponding to that on the data input line Ai onto the data output lines Bi and $\overline{Bi}$ is prepared by an inverter (inverting amplifier). Therefore, the data conversion function f of the neuron unit is defined by data input/output characteristics of the inverter. Further, inversion/non-inversion of the potential level in transmission of the potential of the data input line Ai onto the data output line Bi is determined by the input logic threshold value of the inverter. This input logic threshold value is generally set at ½ of the sum of the source potential $V_{DD}$ and the ground potential $V_{SS}$. While the sigmoid-like nonlinear, monotonously increasing function may be employed as hereinabove described, the total input providing the output data "0.5" must be decided to be zero in this case. Further, a conversion function which is obtained by adding a threshold value to the sigmoid-like, monotonously increasing function may also be employed as hereinabove described.

In general, the input logic threshold value of an inverting amplifier having CMOS (metal-insulating film-semiconductor) structure is determined with parameters of the size of a transistor, i.e., impedance (ON resistance), the threshold voltage of the transistor and the like.

Alternatively, the input logic threshold voltage may be replaced by a reference voltage which is generated within the chip, so that inversion/non-inversion of data in data transmission is determined by large/small comparison of the reference voltage and the voltage level on the data input line Ai.

In each structure, threshold voltages and sensitivity of the inverting amplifier circuits for converting data serve as important factors determining the performance of the neural network. Therefore, it is preferable to minimize deviation of the threshold voltages in the inverting amplifier circuits between chips or within a chip.

However, as a semiconductor circuit implementing a neural network is fined down and/or increased in scale, variations in fabrication parameters (processing temperature, misalignment of masks in patterning, impurity concentration etc.) change transistor characteristics, and if the amplifier circuits are implemented by series-connected inverting amplifiers as in the aforementioned prior art, it is difficult to set the threshold voltages and sensitivity of the amplifier circuits at constant values without causing deviation thereof between chips and within a chip.

Further, the comparison reference voltage providing the threshold values cannot be stably generated. In general, such comparison reference voltage is generated by providing voltage drop to the source voltage $V_{DD}$ through a voltage-drop circuit which is formed by diode-connected MOS (metal-insulating film-semiconductor) transistors or the like. Therefore, a stable reference voltage of a desired value cannot be generated due to the aforementioned variations in transistor characteristics (threshold voltage, ON resistance etc.) and in the source voltage $V_{DD}$, and hence the data conversion characteristics of the amplifier circuits cannot be obtained as designed.

Such variations in the threshold voltages of the amplifier circuits and in the reference voltage change amplifying characteristics of the amplifier circuits, to lead to such malfunctions that the data processing speed, correspondence between input data and output data etc. are varied with semiconductor neural networks to damage reliability of the semiconductor neural networks.

On the other hand, it is known that a Boltzmann model (Boltzmann machine) is obtained by regarding the energy function in the Hopfield model as a probability variable and extending the algorithm of Hopfield to a probability system. FIG. 6 shows exemplary structure of an essential part of a semiconductor neural network in accordance with the Boltzmann model. This structure is disclosed in, for example, "Neuromorphic VLSI Learning System" in "Advanced Research in VLSI 1987" issued by MIT Press, pp. 313-327.

Referring to FIG. 6, neuron units are respectively formed by differential amplifiers Z1 to Zj each having two complementary outputs S and $\overline{S}$. When a neuron is in an "ON" state, its output S is "1" (5 V), and when the neuron is "OFF", the output S is "0" (0 V). The output of each neuron unit (differential amplifier) is fed back to respective differential inputs IN and $\overline{IN}$ through resistive elements R. The resistive elements R, which have conductances changeable, define weights Wij. Self-bias parts 400 are provided to apply self-bias values $-\theta$ to respective input lines IN and $\overline{IN}$. Data of "1" and "0" are steadily applied to the self-bias parts 400 through a differential amplifier $Z_T$. The diagonally arranged differential amplifiers correspond to nerve cells, and perform thresholding processing. The input lines IN and $\overline{IN}$ correspond to dendrites receiving signals from other cells. The data input lines IN and $\overline{IN}$ transmit excitatory and inhibitory signals respectively. The output lines S and $\overline{S}$ correspond to axons which transmit signals from given neurons to next neurons. The resistive elements R correspond to synapses, whose resistance values indicate connection strengths between the neurons.

The resistive elements R, which are arranged at nodes between the data input lines INi and $\overline{INi}$ and the data output lines Sj and $\overline{Sj}$, i.e., the positions of I-th row and J-th column (i, j), can connect the output of a neuron (differential amplifier) Zj to the input of a neuron (differential amplifier) Zi, to provide a positive weight Wij. In the case of the positive weight Wij, a data output line Sj is connected to a data input line INi while a data output line $\overline{Sj}$ is connected to a data input line $\overline{INi}$. In the case of a negative weight coefficient, the data output line $\overline{Sj}$ is connected to the data input line INi, while the data output line Sj is connected to the data input line $\overline{INi}$.

This neural network is initialized by setting the resistance values of the resistive elements R. A subject in the Boltzmann model is to find weights Wkl, with which the neural network itself can implement probability distribution of input/output data "as correct as possible", without supplying the distribution from the exterior. To this end, a weight processor (not shown) is provided for each weight Wkl. This weight processor has a function of latching weight data while shifting the latch data, as well as a function of incrementing or decrementing the latch data in accordance with a predetermined relational expression after each operation loop (+phase, −phase etc.).

The algorithm of the Boltzmann model includes operation 1 (plus phase), operation 2 (minus phase), operation 3 (change of Wkl) and operation 0 (learning of output layer).

The operation 1 includes an annealing process, a data collection process and a process of obtaining P+. The annealing process is carried out by applying an externally generated analog noise signal, whose amplitude is decreased with progress of the operation, to the differential inputs of each differential amplifier. This means that the annealing process is started at a high temperature and thereafter the temperature is sequentially changed to low levels, whereby the neural network system is stabilized to the minimum global energy value of a thermal equilibrium state at a low temperature. This state is caused in each differential amplifier Z, and the differential amplifier Z evaluates the state of itself to set its state "ON" or "OFF". The data collection process is adapted to obtain the number of times when both of respective states of two interconnected neurons (differential amplifiers) are "1". The process of obtaining P+ is adapted to obtain an average value of data obtained in the data collection process.

The operation 2 (minus phase) is adapted to carry out the aforementioned three processes of the operation 1 while fixing only states of neurons (differential amplifiers) corresponding to input data at "1". A value obtained in a process of obtaining an average value in the operation 2 is assumed to be P−.

The operation 3 is a process of changing the weights Wkl by the average values P+ and P− obtained through the operation 1 and the operation 2.

After the aforementioned operation 1 or operation 2, the respective weights Wkl are adjusted by parallel operation, and the weight processors provided in correspondence to the respective weights evaluate the states thereof to increment or decrement the weights. Since the data input/output lines are arrayed in pairs as hereinabove described, the weights adjust their own weights through the aforementioned parallel algorithm by themselves.

FIG. 7 shows an example of specific structure of a resistive element providing a weight WKl. Referring to FIG. 7, a weight part includes four transistor groups TR1, TR2, TR3 and TR4 for providing positive connection and negative connection. Each of the transistor groups TR1 to TR4, which are identical in structure to each other, includes n MOS transistors T0 to Tn−1 and a pass transistor TG.

Conductance ratios of the MOS transistors T0 to Tn−1 (width/length ratios of the transistors) are set as 1:2:...:$2^{n-1}$. The pass transistor TG receives either a sign bit TSGN or $\overline{\text{TSGN}}$ for indicating the sign (positive or negative) of connection, to connect a data input line with a corresponding data output line. Since the transistor groups provided on a diagonal line simultaneously connect data input and output lines, the positive sign bit TSGN is applied to transfer gates TG1 and TG4, while the inverted sign bit $\overline{\text{TSGN}}$ is applied to transfer gates TG2 and TG3. The weight coefficient Wij can be set by making an ON state through appropriate combination of the transistors T0 to Tn−1 in each transistor group.

FIG. 8 shows an example of specific structure of a differential amplifier forming a neuron.

Referring to FIG. 8, the differential amplifier includes four N-channel MOS transistors NT1, NT2, NT3 and NT4 and two P-channel MOS transistors PT1 and PT2. The MOS transistors NT1 and NT2 form a first differential inputs, and the MOS transistors NT3 and NT4 form a second differential inputs. The first differential inputs formed by the MOS transistors NT1 and NT2 receives noise from a noise source NS through a differential amplifier AZ. The first differential inputs formed by the MOS transistors NT1 and NT2 to generate an annealing temperature in the form of noise. The second differential inputs formed by the MOS transistors NT3 and NT4 differentially amplifies data on data input lines IN and $\overline{\text{IN}}$. The second differential inputs calculate an energy gap between an "OFF" state and an "ON" state of a neuron unit (differential amplifier) k. Through employment of the noise source NS, it is intended that the state of the neural network goes out of a quasi-optimum solution which is called the local minimum, to converge to the optimum solution.

A differential output part formed by the MOS transistors PT1 and PT2 derives complementarily symmetrical signals indicating any states between "ON" and "OFF" states. In this case, potential levels transmitted to data output lines S and $\overline{\text{S}}$ are set at a source voltage level or a ground potential level. Thus, a pass transistor TG included in a weight creating part is reliably on or off controlled. A MOS transistor NT5 receiving a predetermined bias potential Vbias at its gate is provided in order to bring the differential amplifier into a constant operating state.

Two types of conductances are connected to the positive input (MOS transistor NT4 in FIG. 8) of the differential amplifier. One is a conductance for pulling up to a voltage Von (voltage transmitted through a positive weight), and the other one is a conductance for pulling down to a voltage Voff (voltage transmitted through a negative weight). The pullup conductance at the positive input is provided by the absolute value of the sum of positive weights from neurons (differential amplifiers) which are in "ON" states and negative weights from neurons (differential amplifiers) which are in "OFF" states. The pulldown conductance is provided by the sum of negative weights from neurons (differential amplifiers) which are in "ON" states and positive weights from neurons which are in "OFF" states. This relation is reversed for the negative input (transistor NT3 in FIG. 8) of the neuron (differential amplifier). The differential amplifier forming this neuron performs the following comparison, assuming that the neurons which are in the "ON" states are expressed as δj=+1 and the neurons which are in the "OFF" states are expressed as δj=−1:

$$\sum_j W_{ij} \cdot \delta_j > \theta_i$$

where $\theta_i$ represents self-bias values provided in correspondence to the respective neurons shown in FIG. 6. Transfer characteristics of the respective data inputs and outputs are defined in accordance with such states. This comparison is made by comparing the positive input of the differential amplifier with a threshold value ½ (Von+Voff). Such comparison requires completely matching transistors with each other. However, even if integration density is so enhanced that transistor matching is made incomplete to cause deviation in operating points, symmetrical output data can be derived therefrom and data can be correctly compared with great noise immunity by employing the aforementioned differential amplifier.

In this structure of the differential amplifier, however, the constant bias voltage Vbias is applied to the gate electrode of the MOS transistor NT5, and therefore, the neuron is formed by a static amplifier. In this case, the differential amplifier is regularly in an operating state from supply of power onward, and the amplifier is not inactivated. Thus, whereby power is unnecessarily used up in this differential amplifier. Further, such a static differential amplifier has rather insufficient sensitivity, and cannot reliably detect small potential difference on the data input lines IN and $\overline{\text{IN}}$ and amplify the same to a desired voltage level to output the same.

In this conventional structure, the neurons are formed by static differential amplifiers while no resetting (initialization) of data input and output lines is performed, and hence much time is required to charge or discharge the data input lines in correspondence to supplied input data. Thus, it takes much time to initialize the neural network. Further, since the data output lines are not reset, it takes much time to establish potentials of the data output lines. In the neural network employing such static differential amplifiers as neurons, therefore, much time is required to bring the network in a stable operating state upon supply of the input data, and hence the processing speed is reduced.

Further, when neuron units are formed by the aforementioned static differential amplifiers, it is difficult to synchronize the operation of this semiconductor neural network with that of an external data processor since all the neuron units are asynchronously operated. Thus, it is difficult to form one synchronous system incorporating conventional neural net.

SUMMARY OF THE INVENTION

An object of the present invention is to provide a semiconductor neural network which has improved operating characteristics.

Another object of the present invention is to provide a semiconductor neural network of low power consumption, which is capable of stable, high-speed operation.

Still another object of the present invention is to provide a semiconductor neural network which comprises neuron units formed by differential amplifiers of high sensitivity, high speed and low power consumption.

A further object of the present invention is to provide a method of stably driving a semiconductor neural network at a high speed with low power consumption.

The semiconductor neural network according to the present invention comprises two-input cross-coupled inverting amplifier circuits serving as neuron units and circuits for activating the cross-coupled inverting amplifiers after potentials on data input lines are developed in response to input data.

Preferably the activating circuits have high impedance loads which weaken the data latch power of the cross-coupled inverting amplifier circuits without damaging amplification characteristics thereof.

The semiconductor neural network according to the present invention preferably comprises equalizer circuits which precharge input parts of the cross-coupled inverting amplifier circuits at a predetermined potential when the cross-coupled inverting amplifier circuits are inactive.

In the semiconductor neural network according to the present invention, the two-input cross-coupled inverting amplifier circuits forming the neuron units reliably detect and amplify potential difference on the data input lines at a high speed and transmit the same onto data output lines. Further, the two-input cross-coupled inverting amplifier circuits function as dynamic type inverting amplifiers under the control of the activating circuits, whereby unnecessary power dissipation thereat can be prevented to reduce the power consumption.

Since the potentials on the data input lines can be initialized by the equalizer circuits, charge or discharge of the data input lines responsive to the input data can be performed at a high speed so that the data input lines can be initialized in a short period, thereby to increase the data processing speed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B illustrate input/output characteristics of conversion functions in neuron models, in which FIG. 2A shows a unit step threshold function and FIG. 2B shows a sigmoid function;

DESCRIPTION OF THE PREFERRED EMBODIMENTS

Figure 1:
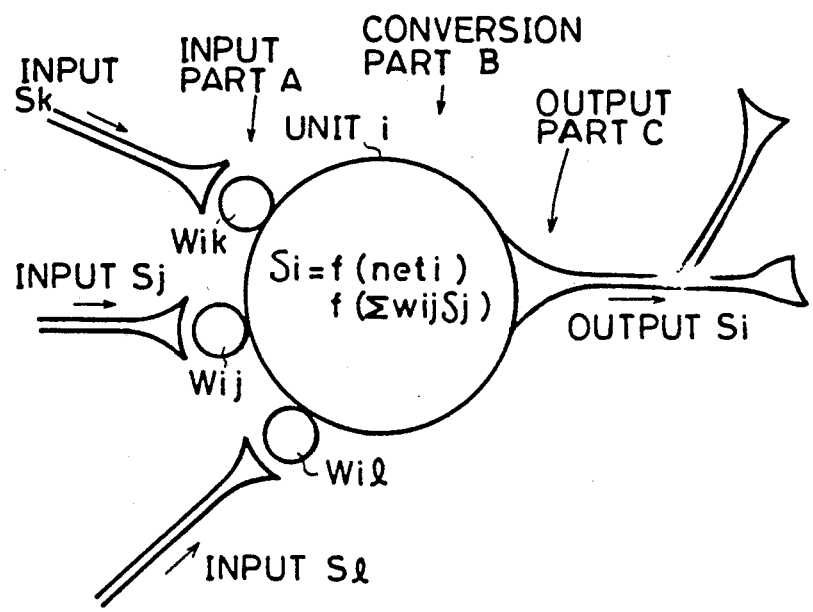
FIG. 1 is a diagram for illustrating a neuron model.
Figure 2A:
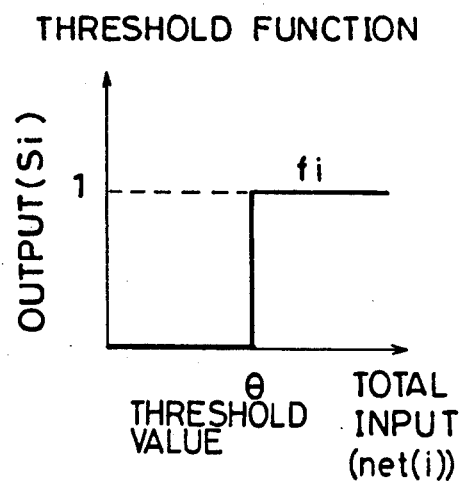
Figure 2B:
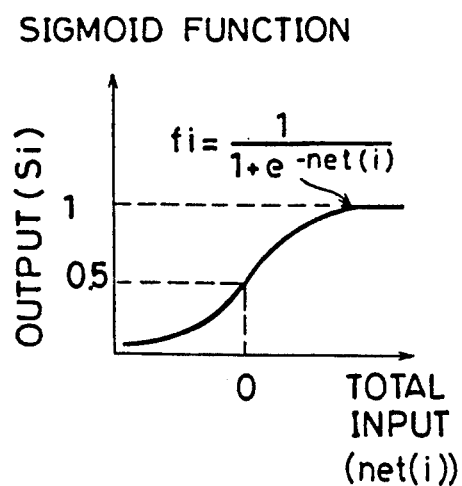
Figure 3:
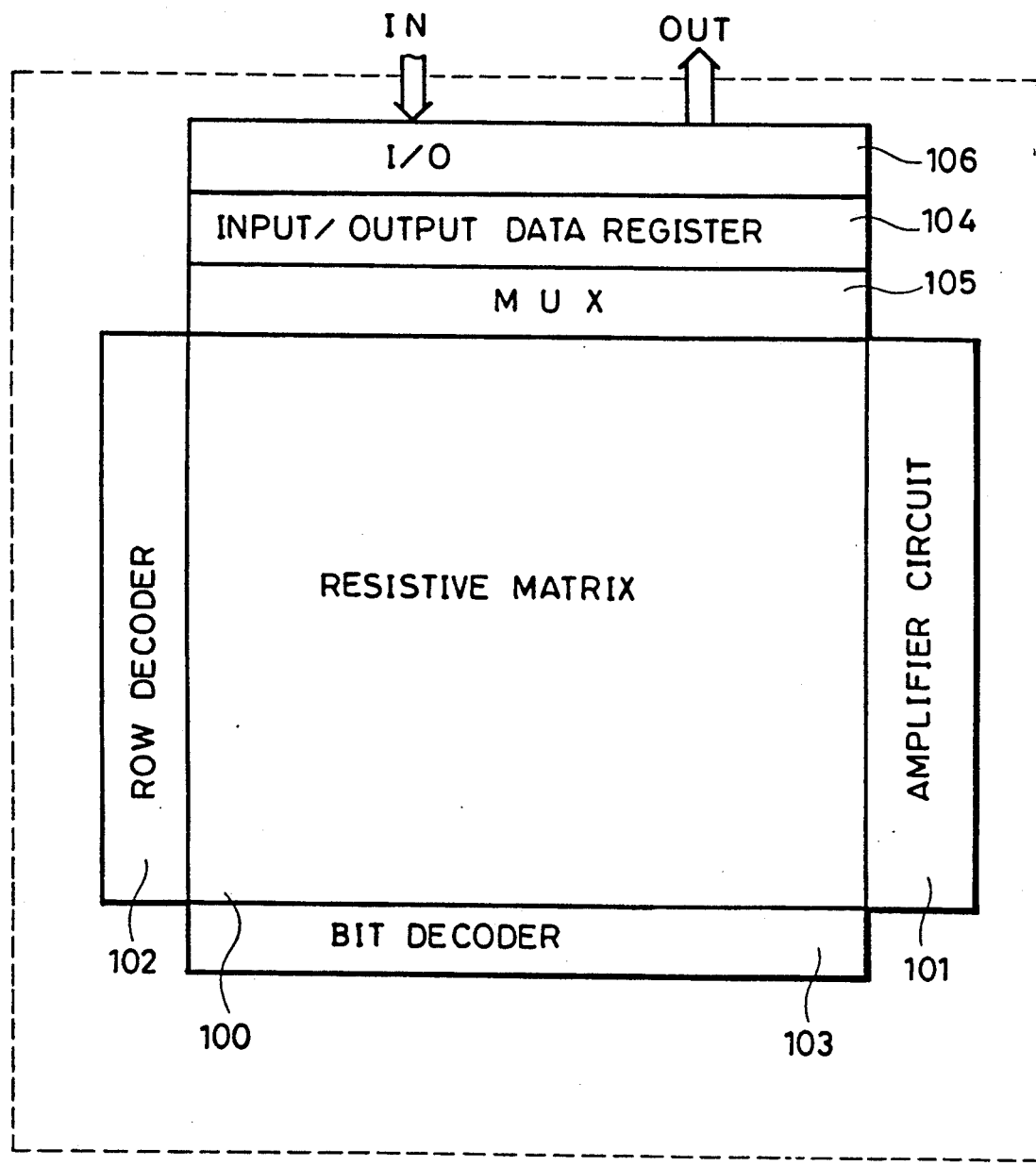
FIG. 3 illustrates an example of overall structure of a conventional semiconductor neural network chip.
Figure 4:
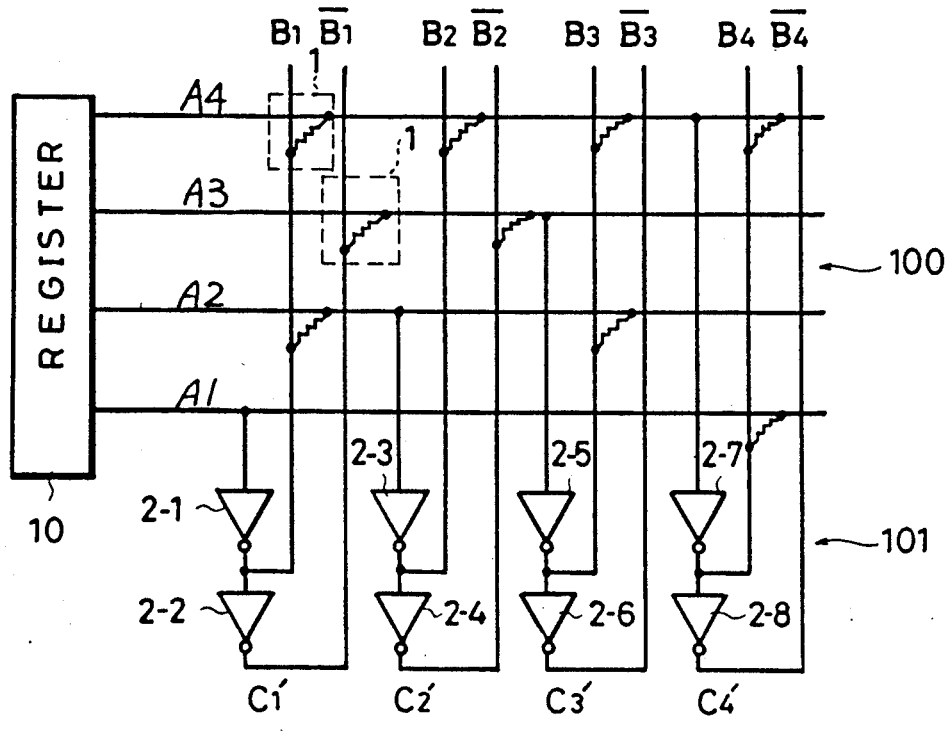
FIG. 4 illustrates exemplary structure of a connection matrix part of a conventional semiconductor neural network.
Figure 9:
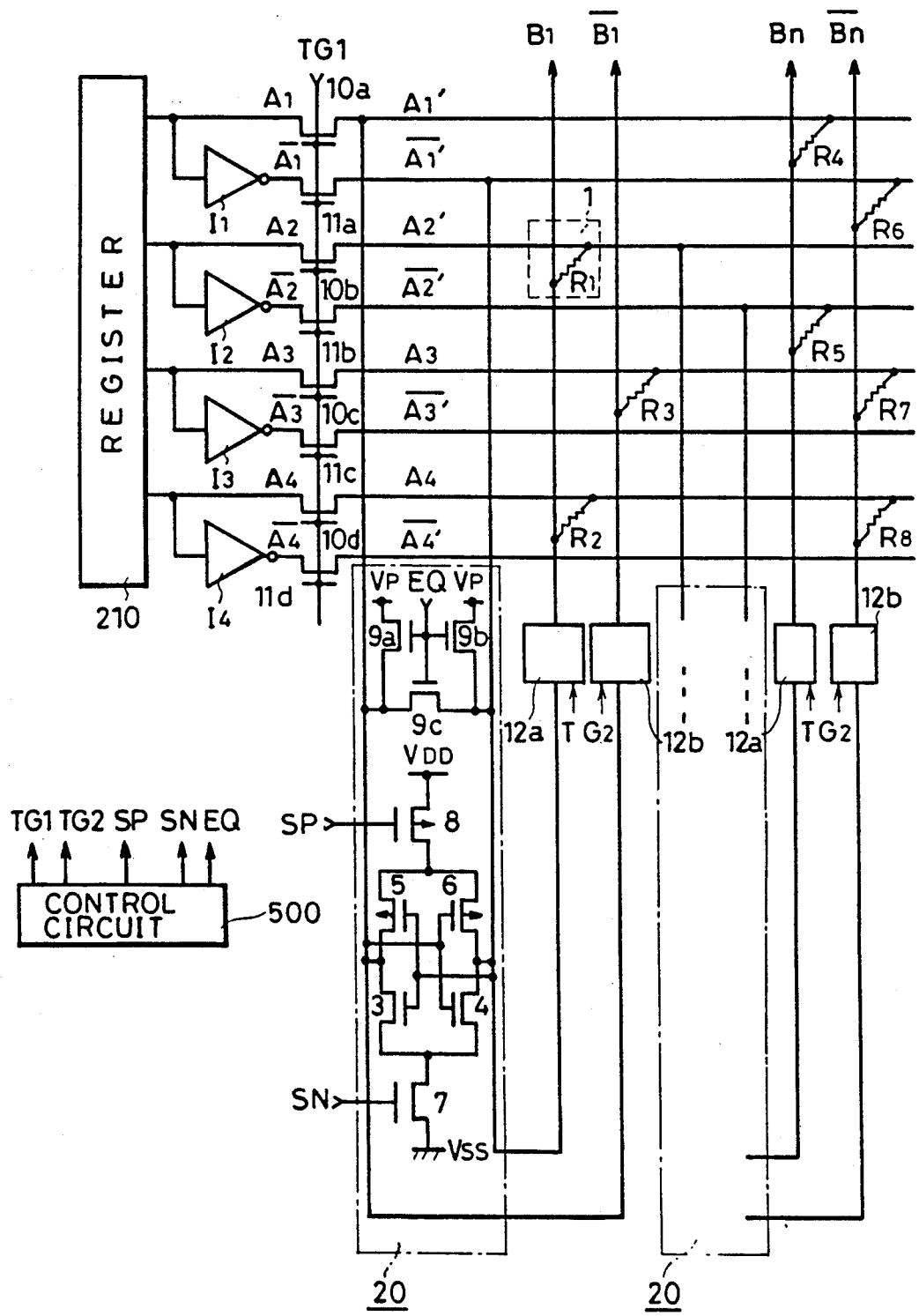
FIG. 9 schematically illustrates the structure of a major part of a semiconductor neural network according to an embodiment of the present invention.

FIG. 9 illustrates exemplary structure of a semiconductor neural network according to an embodiment of the present invention. Only a connection matrix and parts relating thereto are shown in FIG. 9. The structure shown in FIG. 9 provides an improvement of the structure shown in FIG. 4. Referring to FIG. 9, the neural network comprises internal data input line pairs A1′ and $\overline{A1'}$, A2′ and $\overline{A2'}$ and A3′ and $\overline{A3'}$ arrayed in the row direction and data output lines B1, $\overline{B1}$, . . . , Bn and Bn also serving as feedback lines, arrayed in the column direction. Complementary input data are transmitted onto the internal data input line pairs Ai, and $\overline{Ai'}$.

Coupling elements 1 are provided on respective crosspoints between the internal data input lines Ai′ and $\overline{Ai'}$ and the data output lines Bi and $\overline{Bi}$. Each coupling element 1 comprises a resistor R, and supplies a weight (synapse load). The coupling element 1 transmits the potential level on a data output line Bi ($\overline{Bi}$) onto a corresponding data input line Ai ($\overline{Ai}$). The connection state of each coupling element 1 is previously programmed in accordance with the object of processing to be performed (in the case of a Hopfield model).

Transfer gate transistors 10a to 10d and 11a to 11d, which enter ON states in response to a transfer indicating signal TG1, and inverters I1 to I4 are provided in order to transmit input data latched by a register 210 onto the internal data input line pairs Ai′ and $\overline{Ai'}$. Each of the transfer gate transistors 10a to 10d transmits data on a corresponding data input line Ai onto a corresponding internal data input line Ai′. Each of the transfer gate transistors 11a to 11d transmits the output of a corresponding inverter Ii onto a corresponding internal data input line $\overline{Ai'}$.

Each amplifier circuit 20 forming a neuron unit comprises an equalizer circuit part for equalizing and precharging potentials on corresponding data input lines Ai′ and $\overline{Ai'}$ and an amplifier circuit part for detecting and amplifying the potentials on the data input lines Ai′ and $\overline{Ai'}$. The equalizer circuit part comprises N-channel MIS (metal-insulating film-semiconductor) transistors 9a, 9b and 9c. The N-channel MIS transistor 9a transmits a predetermined precharge potential Vp onto the data input line $\overline{A1'}$, the N-channel MIS transistor 9b transmits the precharge potential Vp onto the data input line A1′. The N-channel MIS transistor 9c electrically shorts the data input lines A1′ and $\overline{A1'}$. The MIS transistors 9a, 9b and 9c enter ON states in response to an equalizing signal EQ.

The amplifier circuit part is formed by a two-input cross-coupled inverting amplifier circuit, and includes P-channel MIS transistors 5 and 6 and N-channel MIS transistors 3 and 4. The P-channel MIS transistor 5 and the N-channel MIS transistor 3 are complementarily connected with each other to form a first inverter. The P-channel MIS transistor 6 and the N-channel MIS transistor 4 are complementarily connected with each other to form a second inverter. An output part of the first inverter is connected to the internal data input line A1', and its input part is connected to the internal data input line $\overline{A1'}$. An output part of the second inverter is connected to the internal data input line $\overline{A1'}$, and its input part is connected to the internal data input line A1.

A P-channel MIS transistor 8 and an N-channel MIS transistor 7 are provided in order to control active and inactive states of the amplifier circuit. The P-channel MIS transistor 8 enters an ON state in response to an activating signal SP, to couple a predetermined source potential $V_{DD}$ to the P-channel MIS transistors 5 and 6. The N-channel MIS transistor 7 enters an ON state in response to another activating signal SN, to connect the N-channel MIS transistors 3 and 4 to another source potential (ground potential $V_{SS}$. The input and output parts of the first and second inverters are cross-connected to form a latch circuit. If latching ability of the amplifier circuit 20 is large, it is impossible to respond to the potentials on the internal data input lines Ai' and $\overline{Ai'}$, change the output potentials thereof in accordance with a predetermined transfer function and thereafter transmit the same. Thus, it is necessary to set the latch power of the latch circuit at a small level. Therefore, resistance values (impedance values) of the MIS transistors 7 and 8 are set as large as possible in comparison with those of the transistors forming the inverters. The ratios of the impedance values of the MIS transistors 7 and 8 to those of the MIS transistors 3 to 6 forming the inverters are implemented by setting gate width/gate length of respective transistors at appropriate values, for example.

Each amplifier circuit 20 is provided in correspondence to each pair of internal data input lines Ai' and $\overline{Ai'}$.

Transfer gates 12a and 12b, which enter ON states in response to a second transfer indicating signal TG2, are provided in order to transmit the output of the amplifier circuit 20 to corresponding data output lines Bi and $\overline{Bi}$.

The respective control signals TG1, TG2, SP and SN are generated by an on-chip or off-chip control circuit 500.

Figure 10:
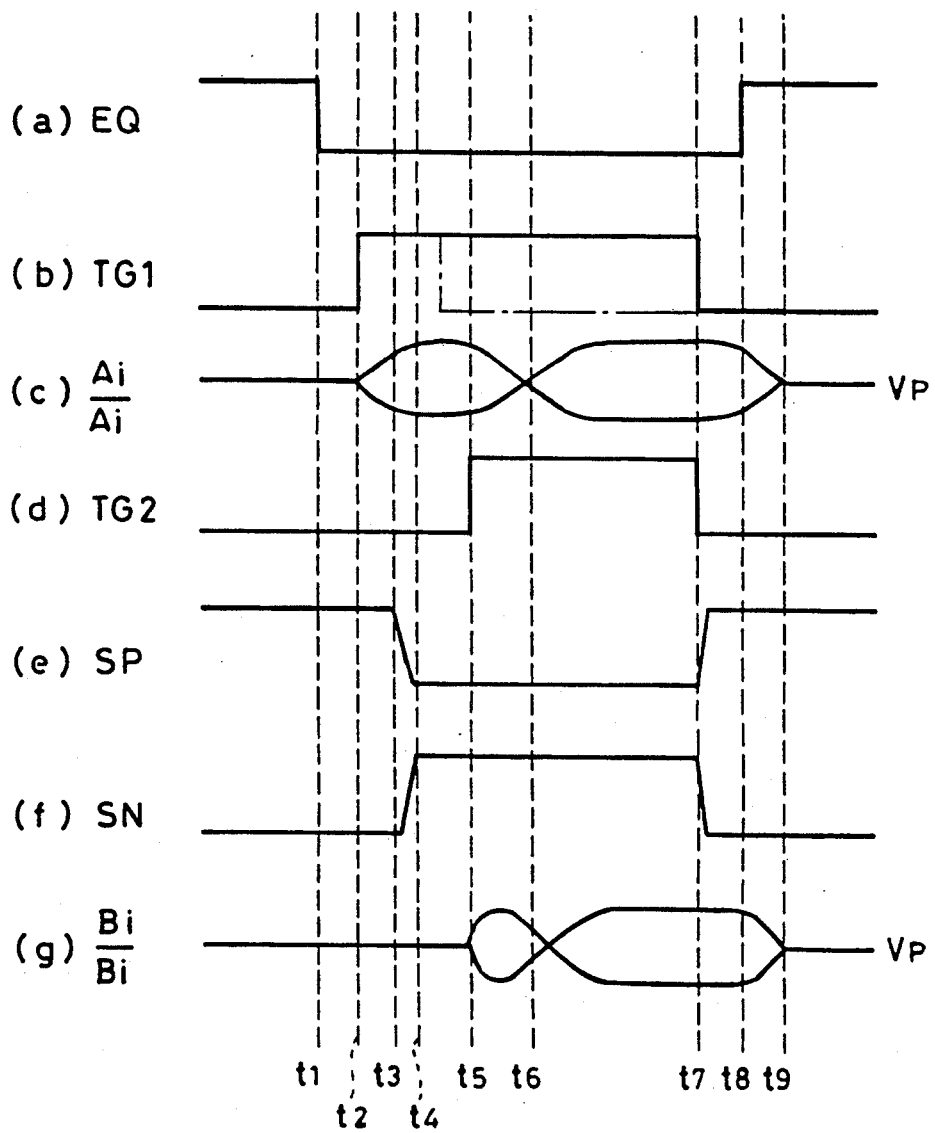
FIG. 10 is a signal waveform diagram showing the operation of the semiconductor neural network shown in FIG. 9.

FIG. 10 is a signal waveform diagram showing the operation of the semiconductor neural network according to the embodiment of the present invention. The operation of the semiconductor neural network according to the embodiment of the present invention is now described with reference to FIGS. 9 and 10.

At a time t1, the signal EQ falls to a low level, whereby the MIS transistors 9a, 9b and 9c enter OFF states and operation for equalizing the potentials of the internal data input lines Ai' and $\overline{Ai'}$ is completed to activate the neural network matrix.

At a time t2, the transfer indicating signal TG1 rises to a high level, and the signal voltage latched in the register 210 is transmitted onto the internal data input lines Ai' and $\overline{Ai'}$ through the transfer gate transistors 10a to 10d and 11a to 11d, whereby the signal potentials on the internal data input lines Ai' and $\overline{Ai'}$ are charged or discharged in response to the input data.

At a time t3, when the potentials on the internal data input lines Ai' and $\overline{Ai'}$ are developed, the amplifier circuit 20 is then activated. That is, the activating signal SP falls to a low level at the time t3, and the activating signal SN rises to a high level at a time t4. Thus, the amplifier circuit formed by the MIS transistors 3 to 6 is activated to detect, amplify and latch the potential levels on the internal data input lines Ai' and $\overline{Ai'}$.

At a time t5, the second transfer indicating signal TG2 rises to a high level, whereby the transfer gates 12a and 12b enter conducting states and the data amplified and latched by the amplifier circuit 20 are transmitted onto the data output lines Bi and $\overline{Bi}$ which also serve as feedback lines. The potential levels transmitted onto the data output lines Bi and $\overline{Bi}$ are fed back onto the internal data input lines Ai' and $\overline{Ai'}$ through the coupling element 1. Such operation is performed in parallel over the entire connection matrix, so that a large scale parallel competitive process is developed over the entire connection matrix. After such feedback operation is frequently repeated, the energy value of the neural network is settled to the minimum. The competitive process in the connection matrix is performed in accordance with an algorithm which is similar to an equation of motion (Ising model, for example) employed in statistical mechanics or the like. Therefore, when the connection matrix is previously programmed to suit to an initial object while setting connection states of the respective coupling elements, the neural network formed by this connection matrix can generate an output signal which is most suitable for a given input signal at a high speed.

Particularly since the amplifier circuit 20 has the two-input cross-coupled inverting amplifier and activating means for activating the inverting amplifier while this amplifier circuit is driven in a dynamic manner, power dissipation can be reduced as compared with a static amplifier circuit, and data on the internal data input lines can be detected in high sensitivity.

Further, since the equalizer circuit (transistors 9a to 9c) is provided so that the internal data input lines can be initialized with equalization to a predetermined precharge potential, input data can be initialized or reset in the connection matrix to improve the data convergence speed in the connection matrix.

At a time t7, the input/output state of the amplifier circuit 20 is stabilized, whereby the data on the data output lines Bi and $\overline{Bi}$ are read out as output data. Thereafter the transfer gate transistors 10a to 10d and 11a to 11d enter OFF states simultaneously with transition of the transfer indicating signal TG1 to a low level. On the other hand, the transfer gates 12a and 12b and the amplifier circuit 20 are inactivated by transition of the transfer indicating signal TG2 and the amplifier circuit activating signals SP and SN respectively, whereby the internal data input and output lines Ai' and $\overline{Ai'}$ and Bi and $\overline{Bi}$ enter electrically floating states.

At a time t8, the equalizing signal EQ rises to a high level, whereby all the MIS transistors 9a to 9c enter ON states to equalize the potentials of the internal data input lines Ai' and $\overline{Ai'}$.

At a time t9, the internal data input lines Ai' and $\overline{Ai'}$ and the data output lines Bi and $\overline{Bi}$ are precharged at the predetermined precharge potential $V_P$ respectively.

Figure 7:
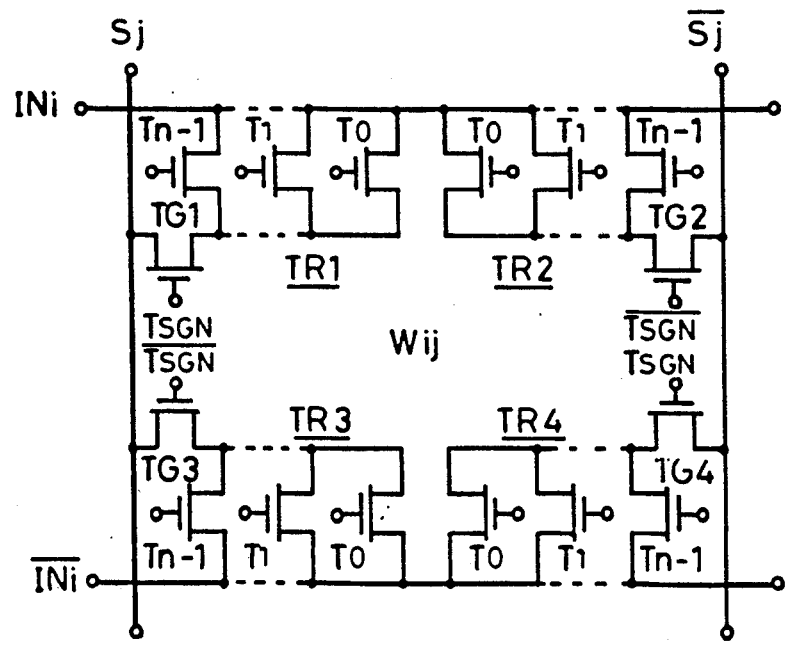
FIG. 7 illustrates the structure of a weight (synapse load) creating part shown in FIG. 6.
Figure 8:
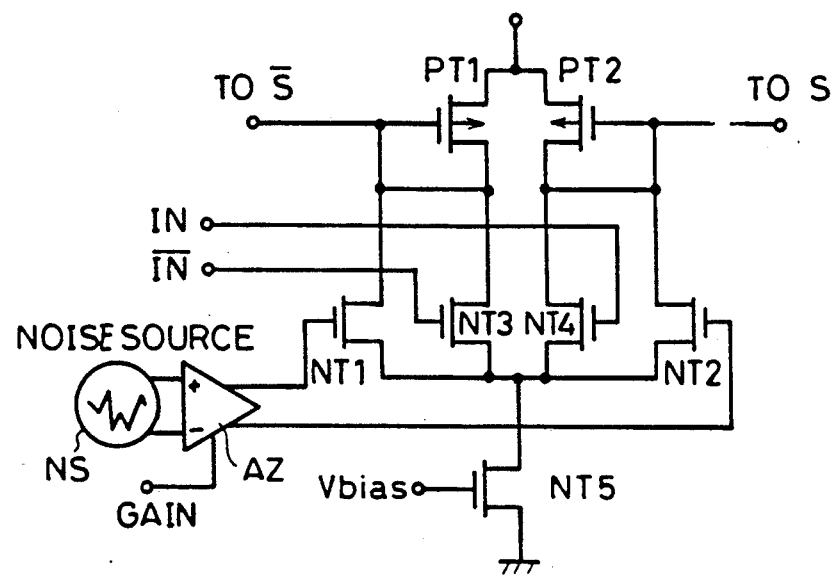
FIG. 8 illustrates exemplary structure of a differential amplifier shown in FIG. 6.

Although equalizing paths on the data output lines Bi and $\overline{Bi}$ are not described in the above, this can be readily implemented when the coupling element 1 is a simple resistive element (in the case of the structure shown in FIG. 7, for example).

Figure 5:
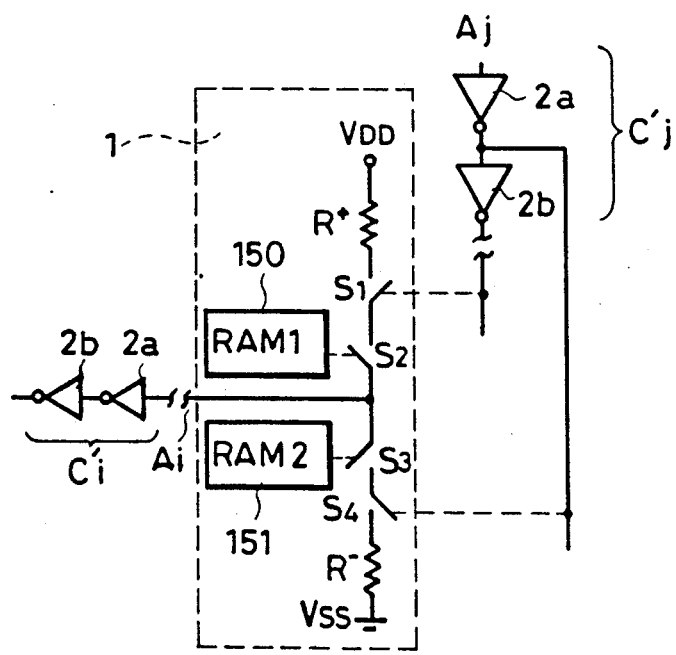
FIG. 5 illustrates exemplary structure of a coupling element shown in FIG. 4.
Figure 6:
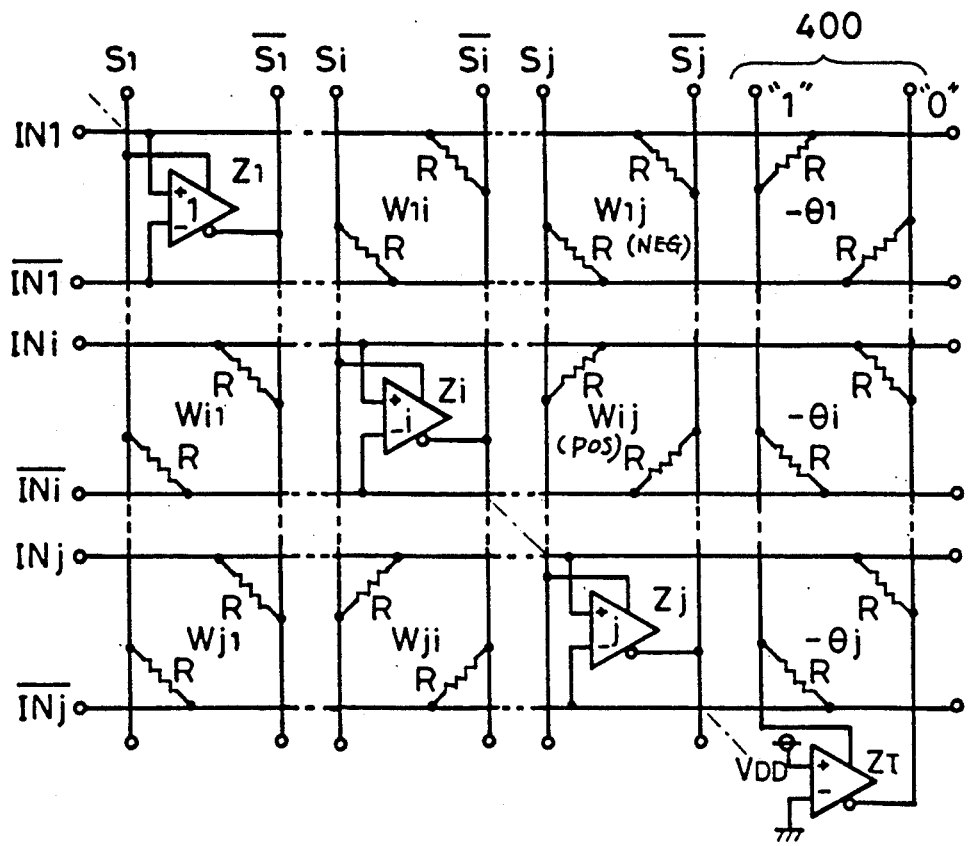
FIG. 6 illustrates exemplary structure of a connection matrix part of a conventional semiconductor neural network.

When the coupling element shown in FIG. 5 is employed, equalization to the predetermined potential is readily implemented by providing equalizer circuits having connection structure similar to that of the transistors 9a to 9c in correspondence to the respective data output lines Bi and $\overline{\text{Bi}}$.

While each amplifier circuit has a certain latch power in the case of development of the parallel competitive process in the aforementioned structure, this latch power is small since the impedance values of the transistors 7 and 8 are made large, and amplifying operation corresponding to the potential levels on the internal data input lines Ai' and $\overline{\text{Ai}}'$ is performed at a high speed without of reduction in progress speed of the competitive process.

In the structure of the embodiment shown in FIGS. 9 and 10, the transfer indicating signal TG1 for bringing the transfer gate transistors 10a to 10d and 11a to 11d into conducting states is maintained at a high level over the active period of the neural network. During the active period of the neural network, therefore, the output part of the register 210 is connected with the internal data input lines Ai' and $\overline{\text{Ai}}'$ and it is necessary to also charge or discharge the data input lines Ai and $\overline{\text{Ai}}$ in progress of the competitive process. Thus, it is undesirable in consideration of power consumption and operating speed. Therefore, when the output impedance of the amplifier circuit 20 and the impedance values of the transfer gates 12a and 12b are optimized, power consumption can be further reduced by causing transition of the control signal TG1 to a low level at timing earlier than transition of the signal TG2 to an active state so that the transfer gate transistors 10a to 10d and 11a to 11d enter nonconduction states (see broken lines at FIG. 10(b)). In the case of this structure, the parallel competitive process can be limited only within the connection matrix, thereby to simplify circuit design in the neural network.

Figure 11:
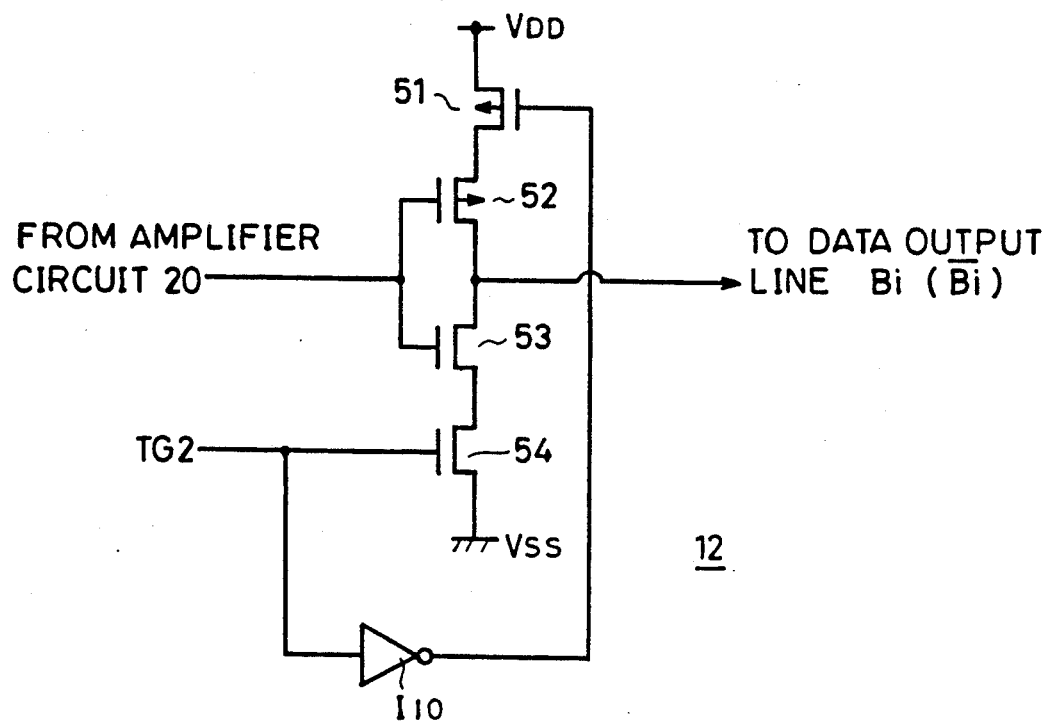
FIG. 11 illustrates exemplary structure of a transfer gate shown in FIG. 9.

FIG. 11 illustrates an example of specific structure of the transfer gate 12a or 12b. Referring to FIG. 11, this transfer gate 12 comprises P-channel MIS transistors 51 and 52 and N-channel MIS transistors 53 and 54. One conduction terminal of the P-channel MIS transistor 51 is connected to a source potential $V_{DD}$. One conduction terminal of the MIS transistor 54 is connected to another source potential (ground potential) $V_{SS}$. One conduction terminal of the P-channel MIS transistor 52 is connected to another conduction terminal of the MIS transistor 51. One conduction terminal of the MIS transistor 53 is connected to another conduction terminal of the MIS transistor 54. The MIS transistors 52 and 53 are complementarily connected with each other to form a CMOS inverter. The output from an amplifier circuit 20 is transmitted to the gates of the MIS transistors 52 and 53. Outputs of the MIS transistors 52 and 53 are transmitted to a data output line Bi ($\overline{\text{Bi}}$). The second transfer indicating signal TG2 is transmitted to the gates of the MIS transistors 51 and 54 through an inverter I10. Due to such structure, the transfer gate 12 can be surely electrically separated from the output part of the amplifier circuit 20 and the data output line Bi ($\overline{\text{Bi}}$) before the transfer indicating signal TG2 is supplied, while the same can enter an ON state in response to the transfer indicating signal TG2 to transmit the output of the amplifier circuit 20 onto the corresponding data output line Bi ($\overline{\text{Bi}}$). In the case of this structure, the impedance of the transfer gate 12 can be readily optimized by adjusting the transistor size, as hereinabove described.

Figure 12:
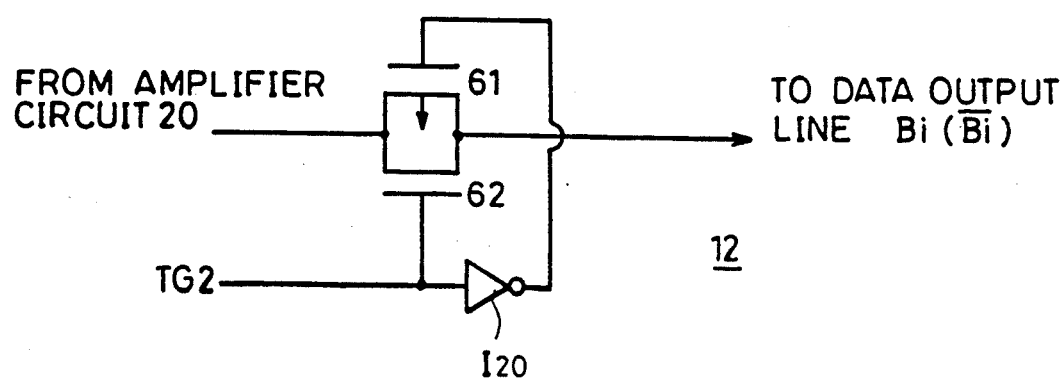
FIG. 12 illustrates another exemplary structure of the transfer gate shown in FIG. 9.

FIG. 12 shows another exemplary structure of the transfer gate 12. Referring to FIG. 12, the transfer gate 12 includes a P-channel MIS transistor 61 and an N-channel MIS transistor 62 which are connected in parallel with each other and an inverter I20. The second transfer indicating signal TG2 is applied to the N-channel MIS transistor 62, while the transfer indicating signal TG2 is also applied to the gate of the MIS transistor 61 through the inverter I20. This transfer gate 12 is known as a bidirectional switching element, which is of low resistance and can reliably transmit the output of the amplifier circuit 20 onto the corresponding data output line Bi ($\overline{\text{Bi}}$).

Figure 13:
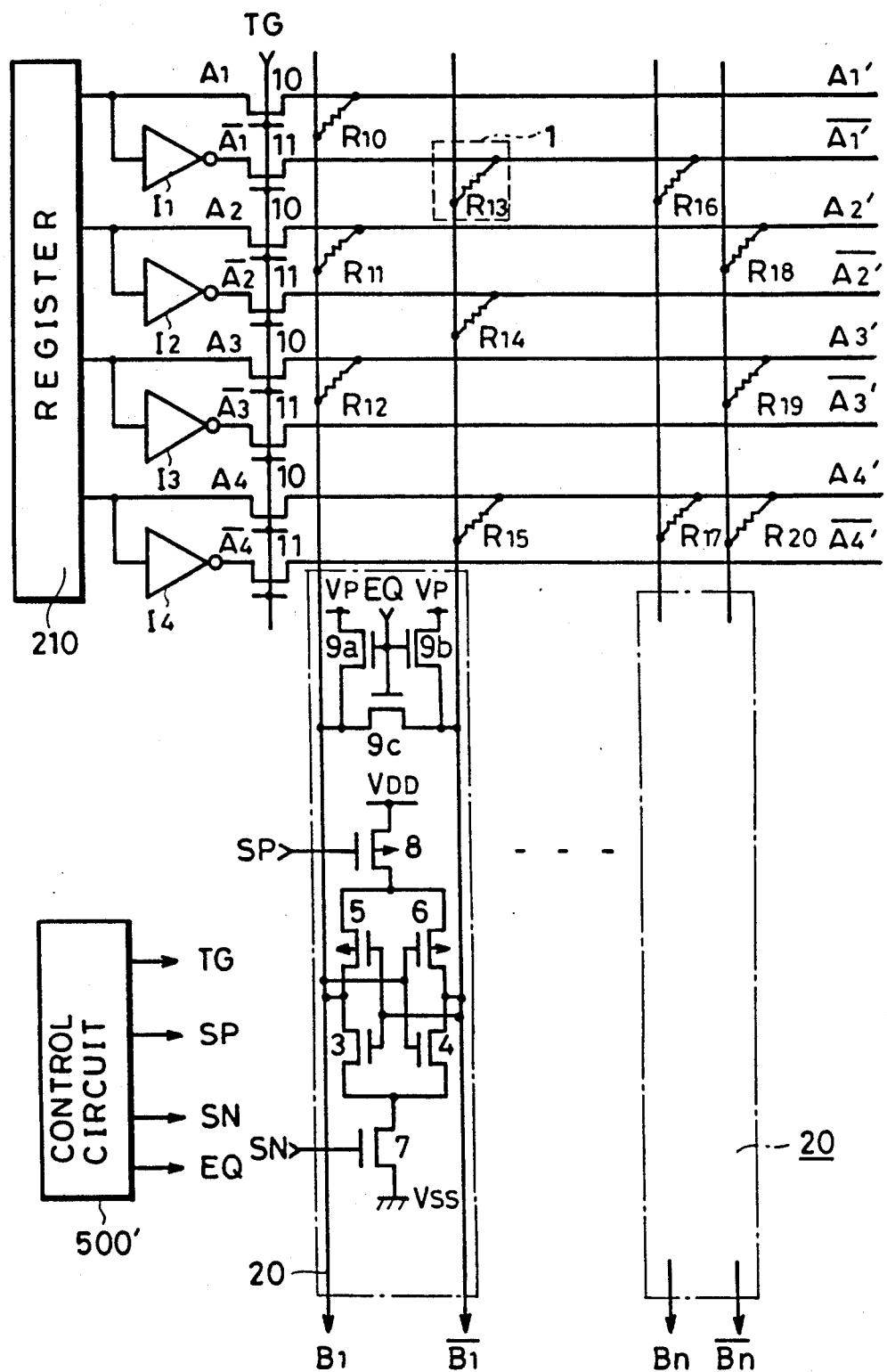
FIG. 13 illustrates the structure of a major part of a semiconductor neural network according to another embodiment of the present invention.
Figure 14:
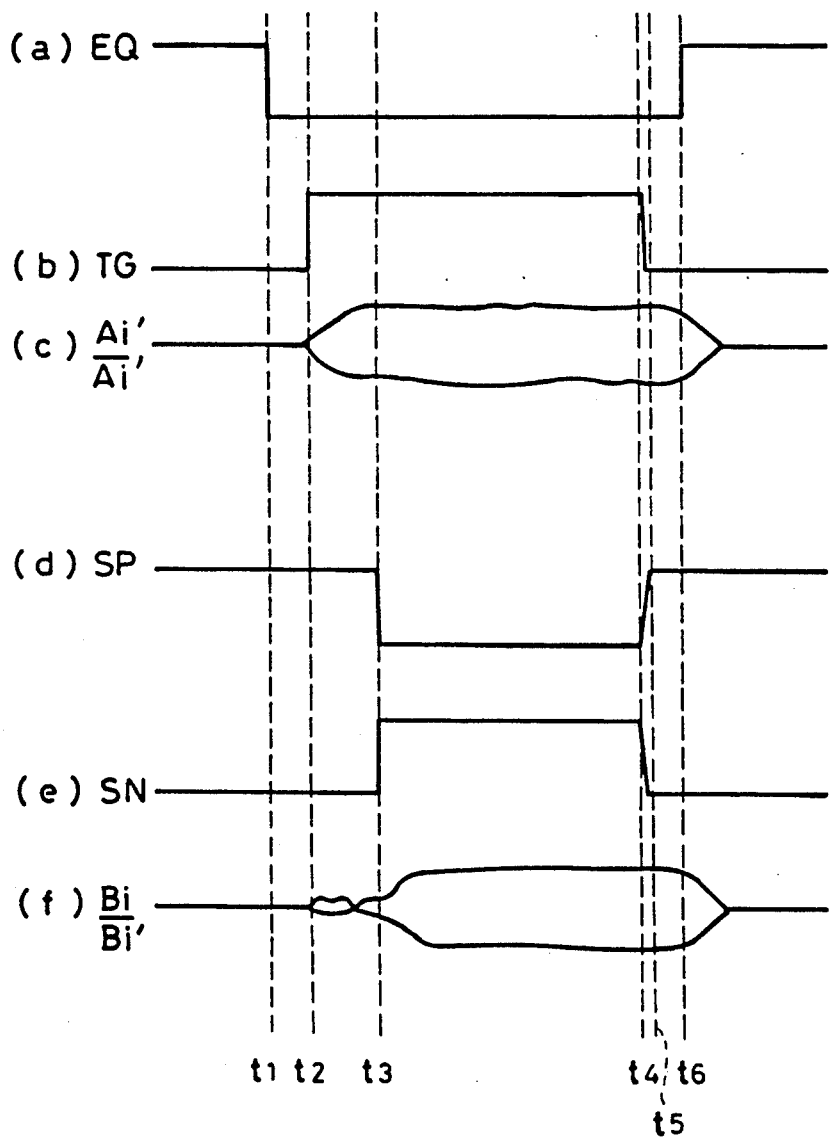
FIG. 14 is a signal waveform diagram showing the operation of the semiconductor neural network shown in FIG. 13.

FIG. 13 illustrates the structure of a semiconductor neural network according to another embodiment of the present invention, which is applied to a single-layer perceptron circuit. In the structure shown in FIG. 13, the transfer gates 12a and 12b and paths for feeding back the outputs of the amplifier circuits 20 provided in the structure of the neural network shown in FIG. 9 are omitted. Parts corresponding to those of the structure shown in FIG. 9 are indicated by the same reference numerals. A transfer control signal TG, which is similar to the control signal TG1, is supplied to gates of transfer gates 10 and 11. A control circuit 500' is provided in an on-chip or off-chip manner, similarly to the control circuit 500. In the structure shown in FIG. 13, coupling elements 1 are provided on crosspoints between data output lines Bi and $\overline{\text{Bi}}$ and internal data input lines Ai' and $\overline{\text{Ai}}'$. FIG. 14 is a timing signal waveform diagram of operation of the semiconductor neural network shown in FIG. 13. The operation of the semiconductor neural network according to the embodiment of the present invention is now described with reference to FIGS. 13 and 14.

At a time t1, an equalizing signal EQ falls to a low level, to activate the neural network. After input data are latched in a data register 210, a transfer indicating signal TG rises to a high level. At this time, potentials corresponding to the input data appear on the internal data input lines Ai' and $\overline{\text{Ai}}'$, while small potential difference responsive to the potentials of the internal data input lines Ai' and $\overline{\text{Ai}}'$ and to the program states of the coupling elements 1 is developed on the data output lines Bi and $\overline{\text{Bi}}$.

At a time t3, signals SP and SN for activating the amplifier circuit 20 enter activating states, whereby the small potential difference developed on the data output lines Bi and $\overline{\text{Bi}}$ is detected and amplified. When the potentials on the data output lines Bi and $\overline{\text{Bi}}$ are asserted, data are read out and thereafter the transfer indicating signal TG and the amplifier circuit activating signals SP and SN enter inactive states at times t4 and t5, whereby the connection matrix is electrically separated from the register 210 and a data reading part (not clearly shown), to enter an electrically floating state.

The equalizing signal EQ again rises to a high level at a time t6, whereby the potentials of the internal data input lines Ai' and $\overline{\text{Ai}}'$ and the data output lines Bi and $\overline{\text{Bi}}$ are equalized and precharged at a predetermined precharge potential.

The amplifier circuits are formed by cross-coupled amplifiers also in the aforementioned structure of the single-layer perceptron circuit, whereby the small potential difference can be reliably detected and amplified at a high speed.

Although the single-layer perceptron circuit is shown in FIG. 13, a two-layer perceptron network can be readily implemented by connecting the data output lines Bi and $\overline{\text{Bi}}$ to the input part of another register so that the data latched in the register are inputted in a second connection matrix, thereby to obtain flexible neural network structure. A perceptron semiconductor network having an arbitrary number of stages or layers can be obtained by repeating this structure.

In the aforementioned embodiments, the coupling elements are provided by Hopfield type RAM memory cells or resistors whose resistance values are set by adjustment of ratios of ON resistances of MOS transistors. However, the coupling elements may be replaced by permanent-type program elements such as fusible fuse elements, or electrically rewritable storage elements. The forms of the coupling elements are not particularly restricted but an effect similar to those of the aforementioned embodiments can be attained with any forms of coupling elements.

The model of the neural network is not restricted to the Hopfield model, and the present invention is also applicable to other models such as the Boltzmann model.

In the aforementioned embodiments, the potentials of the data output lines are transmitted to the internal data input lines in accordance with the program states of the coupling elements. In the case of the perceptron circuit, the potentials of the data input lines are transmitted to the data output lines in accordance with the program states of the coupling elements.

According to the present invention, as hereinabove described, the amplifier circuit forming each neuron unit is structured by the two-input cross-coupled amplifier and the circuit for activating the amplifier after the data are transmitted onto the internal data input lines, whereby a stable amplifier circuit of low power consumption, high sensitivity and high-speed operation can be obtained thereby to obtain a stable semiconductor neural network of low power consumption, high speed and high reliability.

Further, since the equalizer circuit is provided in order to precharge the internal data input and output lines to the predetermined precharge potential in an inactive state of the neural network, the neural network can be initialized and the data input and output lines can be reset, thereby to improve the processing speed of the neural network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor neural network formed by an electronic circuit modeled on a vital nerve net, comprising:

a plurality of data input lines to which input data are transmitted respectively, said plurality of data input lines being arrayed in pairs to form a plurality of data input line pairs to which complementary data are transmitted;

means provided in correspondence to respective ones of said plurality of data input line pairs for differentially amplifying potentials on corresponding said data input line pairs, said differential amplifier means including cross-coupled inverting amplifiers;

a plurality of data output lines arrayed in a direction intersecting with said plurality of data input lines, said plurality of data output lines including a plurality of data output line pairs, said plurality of data output line pairs being provided in correspondence to respective ones of said differential amplifier means to receive outputs of corresponding said differential amplifier means;

a plurality of coupling elements provided at crosspoints of said data input lines and said data output lines for providing for coupling of said data input lines and said data output lines, respective ones of said plurality of coupling elements being programmable in states and providing for coupling of corresponding said data input lines and corresponding said data output lines in accordance with programmed states; and means for activating said differential amplifier means after transmission of said input data to said data input lines.

2. A semiconductor neural network in accordance with claim 1, wherein
respective said coupling elements transmit potentials on corresponding said data output lines onto corresponding said data input lines in accordance with programmed states thereof.

3. A semiconductor neural network in accordance with claim 1, further comprising means for precharging said data input lines and said data output lines at a predetermined potential before transmission of said input data.

4. A semiconductor neural network in accordance with claim 1, wherein
said data input lines comprise first line portions coupled to a register means for deriving input data and second line portions intersecting with said data output lines,
said network further including:
separation/connection means provided between said first line portions and said second line portions, and
means for controlling separation or connection states of said separation/connection means.

5. A semiconductor neural network in accordance with claim 1, wherein:
said data output lines comprise first line portions connected to outputs of said differential amplifier means and second line portions intersecting with said data input lines;
said network further including:
means provided between said first line portions and said second line portions of said data output lines for separating or connecting said first line portions from or with said second line portions, and
means for controlling separation and connection states of said separation/connection means, said control means bringing said separation/connection means into connection states after said differential amplifier means are activated and output states thereof are established.

6. A semiconductor neural network in accordance with claim 5, wherein
said data input lines comprise third line portions couples to a register for deriving input data and fourth line portions intersecting with said second line portions of said data output lines,
said neural network further including:
second means provided between said third line portions and said fourth line portions of said data input lines for separating or connecting said third line portions from or with said fourth line portions, and
second control means for controlling separation/connection states of said separation/connection means.

7. A semiconductor neural network in accordance with claim 6, wherein
said second control means bring said separation/connection means into connection states before activation of said differential amplifier means and set said separation/connection means in separation states before connection of said first line portions and said second line portion of said data output lines.

8. A semiconductor neural network modeled on a vital nerve net, comprising:
a plurality of data input lines to which input data are transmitted respectively, said plurality of data input lines being arrayed in pairs to form a plurality of data input line pairs to which complementary input data are transmitted;
a plurality of data output lines arranged in a direction intersecting with said plurality of data input lines, said plurality of data output lines including a plurality of data output line pairs, said plurality of data output line pairs deriving output data;
means provided in correspondence to respective ones of said data output line pairs for differentially amplifying potentials of corresponding said data output line pairs, said differential amplifier means including cross-coupled inverting amplifiers;
a plurality of coupling elements provided at crosspoints of said data input lines and said data output lines, respective said plurality of coupling elements being previously programmable in states and transmitting or non-transmitting potential levels on corresponding said data input lines onto corresponding said data output lines in accordance with programmed states; and
means for activating said differential amplifier means after transmission of said input data to said data input lines.

9. A semiconductor neural network in accordance with claim 8, further comprising means for precharging said data input lines and said data output lines at a predetermined potential before transmission of said input data to said data input lines.

10. A semiconductor neural network in accordance with claim 9, wherein
said data input lines comprise first line portions coupled to a register means for deriving said input data and second line portions intersecting with said data output lines,
said network further comprising:
means provided between said first line portions and said second line portions for separating or connecting said first line portions from or with said second line portions, and
means for controlling separation/connection states of said separation/connection means, said control means bringing said separation/connection means into separation states when said precharge means are in active states.

11. A method of driving a semiconductor neural network comprising a plurality of data input lines having data input line pairs to which complementary input data are transmitted; a plurality of differential amplifiers formed by cross-coupled inverting amplifiers provided for respective ones of said data input line pairs; a plurality of data output lines provided to intersect with said data input lines, said data output lines being provided for respective ones of said differential amplifiers and formed by data output line pairs; and a plurality of coupling elements arranged at crosspoints of said data input lines and said data output lines, respective said coupling elements being programmable in states and coupling corresponding said data input lines with corresponding said data output lines in accordance with programmed states thereof, said method comprising the steps of:
transmitting input data to said data input lines; and
activating all said differential amplifiers formed by said cross-coupled inverting amplifiers after development of potentials on said data input lines.

12. A method in accordance with claim 11, further comprising the steps of:
precharging said data input lines and said data output lines at a predetermined potential, and
setting said data input lines and said data output lines in electrically floating states after completion of said precharging, in advance of transmission of said input data to said data input lines.

13. A method of driving a semiconductor neural network comprising a register for deriving input data; a plurality of data input lines to which said input data from said register are transmitted, respective said data input lines including data input line pairs to which complementary input data are transmitted and including first line portions coupled to said register and second line portions to which signal potentials of said first line portions are transmitted; differential amplifiers formed by cross-coupled inverting amplifiers provided for respective ones of said data input line pairs for differentially amplifying potentials on corresponding said data input line pairs; a plurality of data output line pairs provided for respective ones of said differential amplifiers, said data output line pairs including third line portions coupled to outputs of said differential amplifiers and fourth line portions intersecting with said second line portions of said data input lines; and a plurality of coupling elements arranged at crosspoints of said second line portions of said data input lines and said fourth line portions of said data output lines, respective said coupling elements being programmable in states and providing coupling of said fourth line portions of corresponding said output lines and said second line portions of corresponding said input lines in accordance with programmed states thereof, said method comprising the steps of:
separating said first line portions and said second line portions of said data input lines from each other while separating said third line portions and said fourth line portions of said data output lines from each other;
precharging said second line portions and said data output lines at a predetermined potential;
connecting said first line portions with said second line portions of said data input lines and transmitting said input data to said second line portions after completion of said precharging;
activating said differential amplifiers after development of potentials of said second line portions; and
connecting said third line portions and said fourth line portions of said data output lines with each other after activation of outputs of said differential amplifiers.

14. A method in accordance with claim 13, further comprising a step of separating said first line portions and said second line portions of said data input lines from each other after development of outputs of said differential amplifiers before connection of said third line portions and said fourth line portions.

15. A method of driving a semiconductor neural network comprising a register for deriving input data; a plurality of data input lines to which said input data from said register are transmitted, respective said data input lines including complementary input line pairs to which complementary data are transmitted and including first line portions coupled to said register and second line portions to which signals from said first line portions are transmitted; data output lines provided to intersect with said data input lines, said data output lines including data output line pairs for deriving complementary output data; differential amplifiers provided for respective ones of said data output line pairs for differentially amplifying potentials of corresponding said data output line pairs, said differential amplifiers being formed by cross-coupled inverting amplifiers; and coupling elements provided at crosspoints of said data output lines and said second line portions of said data input lines, respective said coupling elements being programmable in states and providing coupling corresponding said data output lines and said second line portions in accordance with programmed states thereof, said method comprising the steps of:

transmitting said input data to said second line portions of said data input lines; and activating said differential amplifiers after development of potentials of said second line portions of said data input lines.

16. A method in accordance with claim 15, further comprising in advance of transmission of said input data to said second line portions the steps of:

separating said first line portions from said second line portions: precharging said second line portions and said data output line pairs at a predetermined potential;

setting said second line portions and said data output line pairs in electrically floating states after completion of said precharging, and connecting said first line portions with said second line portions.

* * * * *